US012701065B2

(12) United States Patent
Song et al.

(10) Patent No.: US 12,701,065 B2
(45) Date of Patent: Aug. 4, 2026

(54) IN-BAND EDGE-TO-EDGE ROUND-TRIP TIME MEASUREMENT

(71) Applicant: Huawei Technologies Co., Ltd., Shenzhen (CN)

(72) Inventors: Haoyu Song, San Jose, CA (US); Linda Dunbar, Plano, TX (US); Kaippallimalil Mathew John, Carrollton, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 18/325,831

(22) Filed: May 30, 2023

(65) Prior Publication Data

US 2023/0300051 A1     Sep. 21, 2023

Related U.S. Application Data

(63) Continuation of application No. PCT/US2020/062617, filed on Nov. 30, 2020.

(51) Int. Cl.
H04L 43/0864     (2022.01)
H04L 69/22      (2022.01)

(52) U.S. Cl.
CPC .......... H04L 43/0864 (2013.01); H04L 69/22 (2013.01)

(58) Field of Classification Search
CPC ..... H04L 43/0864; H04L 69/22; H04L 41/34; H04L 41/04
See application file for complete search history.

(56) References Cited

U.S. PATENT DOCUMENTS

| | | | |
|---|---|---|---|
| 2008/0019282 A1* | 1/2008 | Alaria | H04L 43/0858 |
| | | | 370/252 |
| 2020/0162307 A1* | 5/2020 | Chen | H04L 65/00 |
| 2022/0094613 A1* | 3/2022 | Wang | H04L 43/10 |

FOREIGN PATENT DOCUMENTS

| | | |
|---|---|---|
| EP | 2211479 A1 | 7/2010 |
| WO | 2008010918 A2 | 1/2008 |

OTHER PUBLICATIONS

Opsawg et al, "In-situ Flow Information Telemetry draft-song-opsawg-ifit-framework-13," Internet Draft, Oct. 5, 2020, 28 pages (Year: 2020).*
Brockners et al, "Data Fields for In-situ OAM draft-ietf-ippm-ioam-data-11," Internet Draft, Nov. 22, 2020, 33 pages (Year: 2020).*

(Continued)

*Primary Examiner* — Schquita D Goodwin
(74) *Attorney, Agent, or Firm* — Conley Rose, P.C.

(57)     ABSTRACT

A method implemented by a network edge node including adding a first header including a flags field and a data field including a first metadata to a first packet. The network edge node sets a first flag in the flags field of the first header to a first value to indicate that the first packet is a forward flow packet. The network edge node transmits the first packet towards a second network edge node. The network edge node receives a second packet including the first metadata in the data field and a second flag in the flags field set to the first value to indicate that the second packet is a reverse flow packet. The network edge generates a second metadata corresponding to receipt of the second packet and transmits an export message that includes the first metadata and second metadata toward a controller.

20 Claims, 7 Drawing Sheets

*200*

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  202   Namespace-ID          |Flags 204|   IOAM-E2E-Type  206 |
+-+-+-+-+-+-+-+-+-+-+-+-+-+-+-+-+-+-+-+-+-+-+-+-+-+-+-+-+-+-+-+-+
|  208                                                          |
|       E2E Option data field determined by IOAM-E2E-Type      |
|                                                               |
|                                                               |
+-+-+-+-+-+-+-+-+-+-+-+-+-+-+-+-+-+-+-+-+-+-+-+-+-+-+-+-+-+-+-+-+
```

(56) References Cited

OTHER PUBLICATIONS

Song, H., et al., "In-band Edge-to-Edge Round Trip Time Measurement," draft-song-ippm-inband-e2e-rtt-measurement-00, IPPM Internet Draft, Nov. 30, 2020, 7 pages.

Brockners, Ed., et al., "Data Fields for In-situ OAM," IPPM, draft-ietf-ippm-ioam-data-10, Jul. 13, 2020, 44 pages.

Conta, et al., "Internet Control Message Protocol (ICMPv6) for the Internet Protocol Version 6 (IPv6) Specification", RFC 4443, Mar. 2006, 24 pages.

Fioccola, Ed., et al., "Alternate Marking method for passive and hybrid performance monitoring," draft-ietf-ippm-alt-mark-14, Dec. 7, 2017, 33 pages.

Hedayat, et al., "A Two-Way Active Measurement Protocol (TWAMP)," RFC 5357, Oct. 2008, 26 pages.

Song, et al., "In-situ Flow Information Telemetry," draft-song-opsawg-ifit-framework-12, OPSAWG, Apr. 14, 2020, 28 pages.

* cited by examiner

Figure 2:
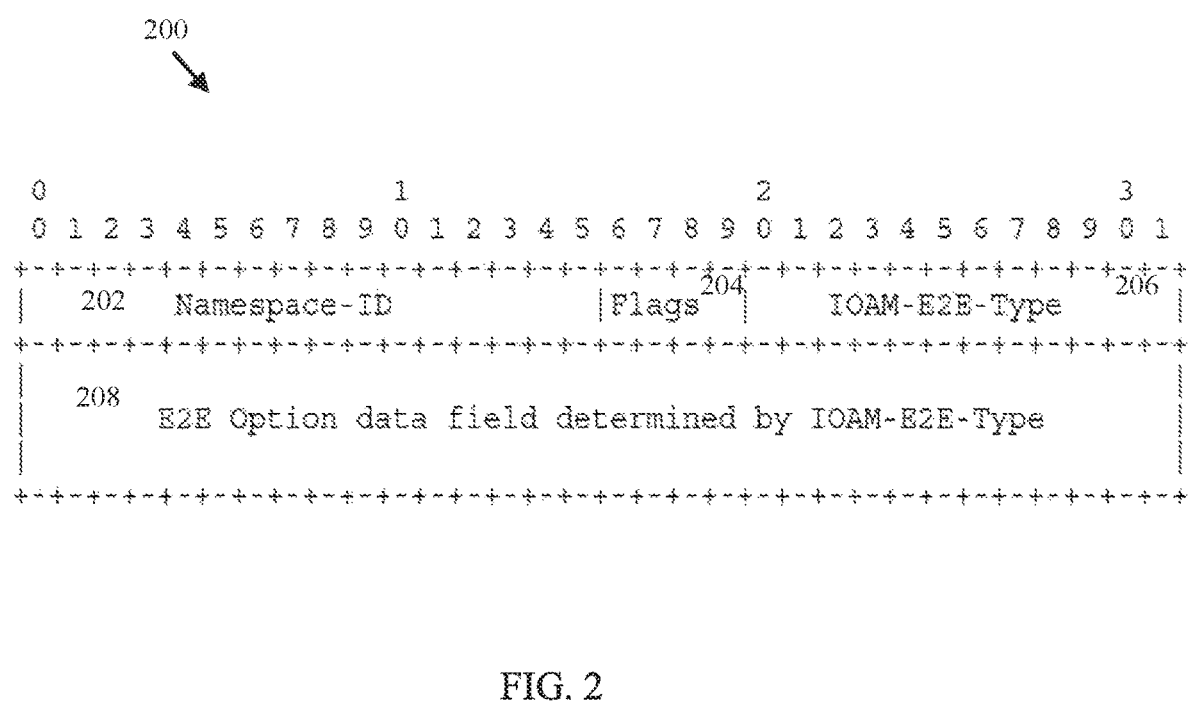

200

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   202   Namespace-ID             |Flags 204|   IOAM-E2E-Type  206 |
+-+-+-+-+-+-+-+-+-+-+-+-+-+-+-+-+-+-+-+-+-+-+-+-+-+-+-+-+-+-+-+-+
|    208                                                          |
|       E2E Option data field determined by IOAM-E2E-Type        |
|                                                                |
+-+-+-+-+-+-+-+-+-+-+-+-+-+-+-+-+-+-+-+-+-+-+-+-+-+-+-+-+-+-+-+-+
```

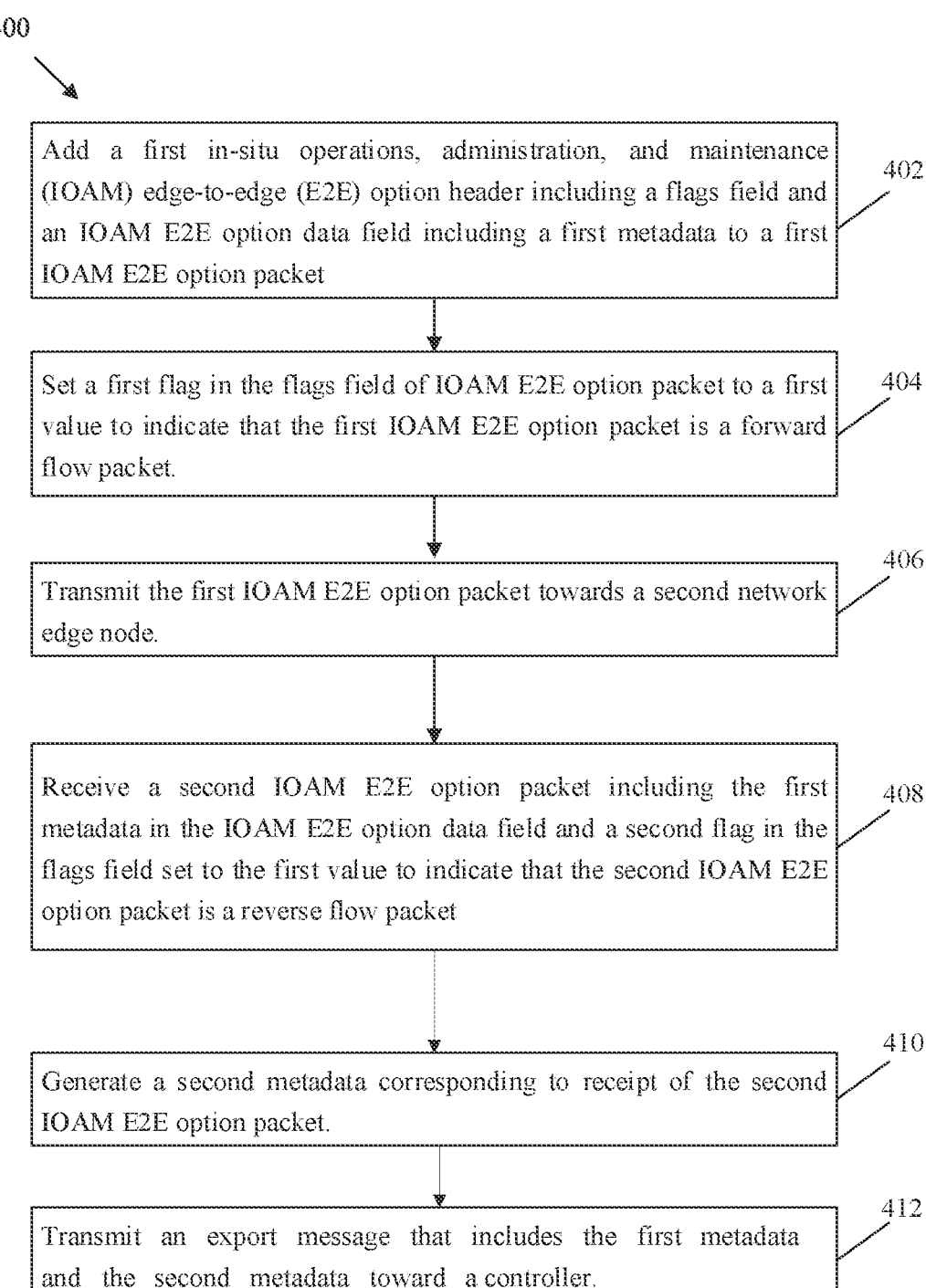

Add a first in-situ operations, administration, and maintenance (IOAM) edge-to-edge (E2E) option header including a flags field and an IOAM E2E option data field including a first metadata to a first IOAM E2E option packet   402

Set a first flag in the flags field of IOAM E2E option packet to a first value to indicate that the first IOAM E2E option packet is a forward flow packet.   404

Transmit the first IOAM E2E option packet towards a second network edge node.   406

Receive a second IOAM E2E option packet including the first metadata in the IOAM E2E option data field and a second flag in the flags field set to the first value to indicate that the second IOAM E2E option packet is a reverse flow packet   408

Generate a second metadata corresponding to receipt of the second IOAM E2E option packet.   410

Transmit an export message that includes the first metadata and the second metadata toward a controller.   412

Figure 5:
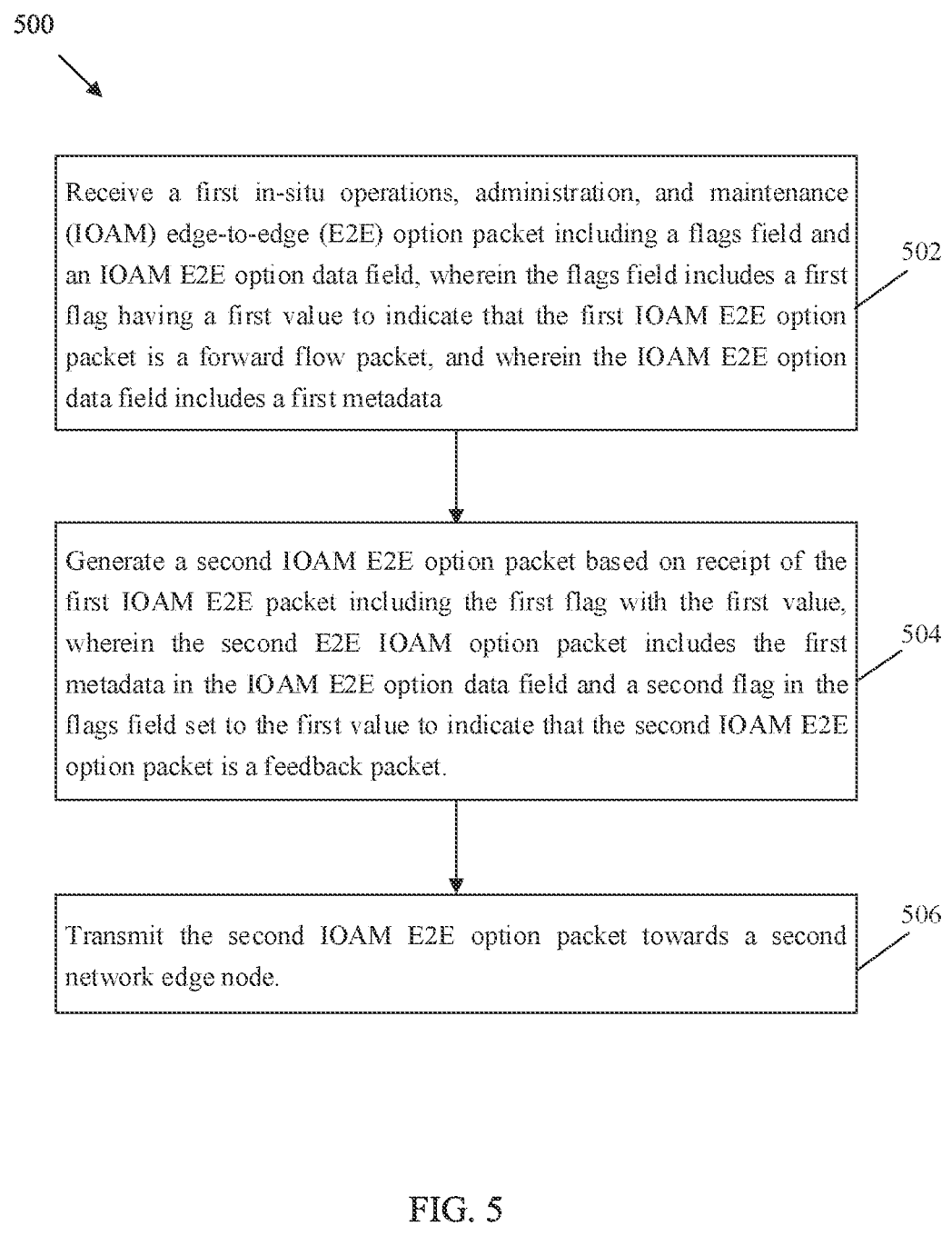

Receive a first in-situ operations, administration, and maintenance (IOAM) edge-to-edge (E2E) option packet including a flags field and an IOAM E2E option data field, wherein the flags field includes a first flag having a first value to indicate that the first IOAM E2E option packet is a forward flow packet, and wherein the IOAM E2E option data field includes a first metadata

502

Generate a second IOAM E2E option packet based on receipt of the first IOAM E2E packet including the first flag with the first value, wherein the second E2E IOAM option packet includes the first metadata in the IOAM E2E option data field and a second flag in the flags field set to the first value to indicate that the second IOAM E2E option packet is a feedback packet.

504

Transmit the second IOAM E2E option packet towards a second network edge node.

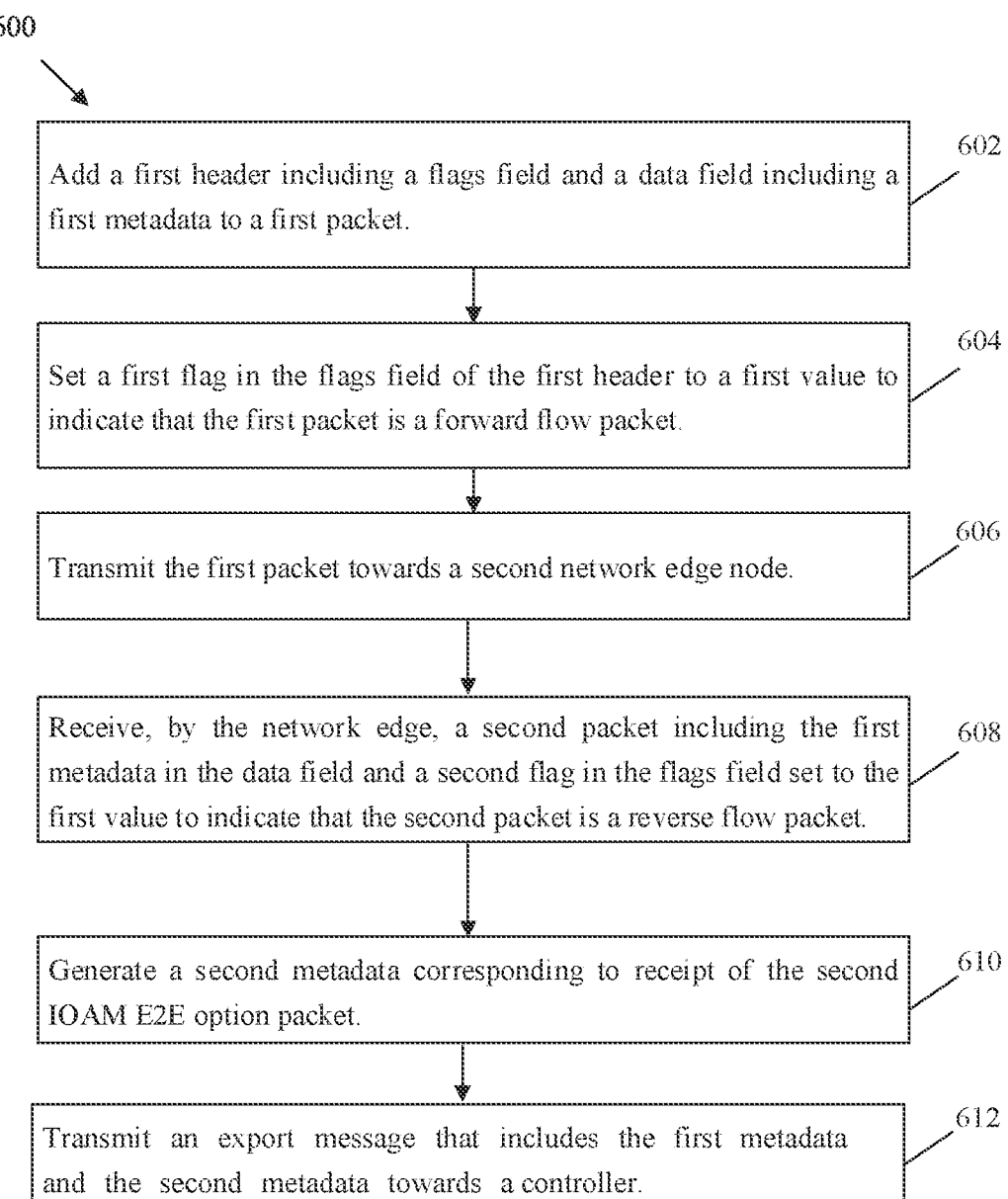

602

Add a first header including a flags field and a data field including a first metadata to a first packet.

604

Set a first flag in the flags field of the first header to a first value to indicate that the first packet is a forward flow packet.

606

Transmit the first packet towards a second network edge node.

608

Receive, by the network edge, a second packet including the first metadata in the data field and a second flag in the flags field set to the first value to indicate that the second packet is a reverse flow packet.

610

Generate a second metadata corresponding to receipt of the second IOAM E2E option packet.

612

Transmit an export message that includes the first metadata and the second metadata towards a controller.

IN-BAND EDGE-TO-EDGE ROUND-TRIP TIME MEASUREMENT

CROSS-REFERENCE OF RELATED APPLICATIONS

This patent application is a continuation of International Patent Application No. PCT/US2020/062617 filed on Nov. 30, 2020, by Futurewei Technologies, Inc., and titled "Inband Edge-to-Edge Round-Trip Time Measurement," which is hereby incorporated by reference.

TECHNICAL FIELD

The present disclosure is generally related to network telemetry, and is specifically related to systems and methods to monitor and measure network performance within network edge nodes in a communications network.

BACKGROUND

Operations, administration, and management (OAM) includes the processes, activities, tools, and standards used to operate, administer, and maintain a system, such as a telecommunications network. There are two types of OAM, out-of-band OAM and in-band OAM. Out-of-band OAM measurement traffic is transported as dedicated traffic independent from regular data traffic. Examples of out-of-band OAM include active probe-based mechanisms such as ping or traceroute. In-band OAM measurement traffic is embedded in regular data traffic. Examples of in-band OAM include in-situ OAM Trace option type and in-situ OAM edge-to-edge (E2E) option type. However, these existing out-of-band OAM and in-band OAM performance measurement approaches lack in monitoring and measuring in-band edge-to-edge performance of the network, thereby limiting the capability to manage and identify problems in the network in real-time.

SUMMARY

A first aspect relates to a method implemented by a network edge node. The method includes adding a first in-situ operations, administration, and maintenance (IOAM) edge-to-edge (E2E) option header including a flags field and an IOAM E2E option data field including a first metadata to a first IOAM E2E option packet, setting a first flag in the flags field of the IOAM E2E option packet to a first value to indicate that the first IOAM E2E option packet is a forward flow packet, transmitting the first IOAM E2E option packet towards a second network edge node, receiving a second IOAM E2E option packet including the first metadata in the IOAM E2E option data field and a second flag in the flags field set to the first value to indicate that the second IOAM E2E option packet is a reverse flow packet, generating a second metadata corresponding to receipt of the second IOAM E2E option packet, and transmitting an export message that includes the first metadata and the second metadata toward a controller.

The disclosed method provides a feedback mechanism implemented as an extension to the existing IOAM standard (e.g., IOAM E2E option) for calculating RTT between network edge nodes and hence, solve one or more of the problems associated with monitoring and measuring in-band edge-to-edge performance of the network as described below. Therefore, the disclosed method makes the measurements accurate and supports various network-based traffic engineering and load balancing algorithms.

In a first implementation form of the method according to the first aspect, the IOAM E2E option header is added to the first IOAM E2E option packet in accordance with an instruction received from the controller.

In a second implementation form of the method according to the first aspect or any other implementation of the first aspect, the IOAM E2E option header further comprises a namespace-id field and an IOAM E2E type field.

In a third implementation form of the method according to the first aspect or any other implementation of the first aspect, the flags field is a part of the namespace-id field in the IOAM E2E option header.

In a fourth implementation form of the method according to the first aspect or any other implementation of the first aspect, the flags field is a new field that is added in the first IOAM E2E option packet.

In a fifth implementation form of the method according to the first aspect or any other implementation of the first aspect, the flags field comprises a plurality of flags including the first flag and the second flag.

In a sixth implementation form of the method according to the first aspect or any other implementation of the first aspect, the first metadata comprises a first identifier and/or a first timestamp corresponding to the first IOAM E2E option packet.

In a seventh implementation form of the method according to the first aspect or any other implementation of the first aspect, the first identifier comprises a sequence number or a random number.

In an eighth implementation form of the method according to the first aspect or any other implementation of the first aspect, the first timestamp represents a time at which the first IOAM E2E option packet was received by the network edge node.

In a ninth implementation form of the method according to the first aspect or any other implementation of the first aspect, the method further includes generating, by a clock at the network edge node, a first timestamp corresponding to the first IOAM E2E option packet.

In a tenth implementation form of the method according to the first aspect or any other implementation of the first aspect, the second metadata comprises a second timestamp corresponding to the second IOAM E2E option packet.

In an eleventh implementation form of the method according to the first aspect or any other implementation of the first aspect, the second timestamp represents a time at which the second IOAM E2E option packet was received by the network edge node.

In a twelfth implementation form of the method according to the first aspect or any other implementation of the first aspect, the method further includes transmitting the first timestamp and the second timestamp to the controller.

In a thirteenth implementation form of the method according to the first aspect or any other implementation of the first aspect, the method further includes determining a round-trip time (RTT) between the network edge node and the second network edge node based on a difference between the first timestamp and the second timestamp.

In a fourteenth implementation form of the method according to the first aspect or any other implementation of the first aspect, the method further includes filtering and periodically selecting target packets including the first packet from a packet flow based on predetermined parameters, wherein the filtering includes access control list (ACL) filtering.

In a fifteenth implementation form of the method according to the first aspect or any other implementation of the first aspect, the network edge node is an ingress network edge node and the second network edge node is an egress network edge node.

A second aspect relates to a method implemented by a network edge node. The method includes receiving a first in-situ operations, administration, and maintenance (IOAM) edge-to-edge (E2E) option packet including a flags field and an IOAM E2E option data field including a first metadata, wherein the flags field includes a first flag having a first value to indicate that the first IOAM E2E option packet is a forward flow packet, generating a second IOAM E2E option packet based on receipt of the first IOAM E2E packet including the first flag with the first value, wherein the second E2E IOAM option packet includes the first metadata in the IOAM E2E option data field and a second flag in the flags field set to the first value to indicate that the second IOAM E2E option packet is a feedback packet, and transmitting the second IOAM E2E option packet towards a second network edge node.

The disclosed method provides a feedback mechanism implemented as an extension to the existing IOAM standard (e.g., IOAM E2E option) for calculating RTT between network edge nodes and hence, solve one or more of the problems associated with monitoring and measuring in-band edge-to-edge performance of the network as described below. Therefore, the disclosed method makes the measurements accurate and support various network-based traffic engineering and load balancing algorithms.

In a first implementation form of the method according to the second aspect or any other implementation of the second aspect, the method further includes removing the first metadata from the first IOAM E2E option packet and copying the first metadata to the second IOAM E2E option packet before transmitting to the second network edge node.

In a second implementation form of the method according to the second aspect or any other implementation of the second aspect, the first metadata comprises an identifier and a timestamp corresponding to the first IOAM E2E option packet.

In a third implementation form of the method according to the second aspect or any other implementation of the second aspect, the second network edge node is an ingress network edge node and the network edge node is an egress network edge node.

A third aspect relates to a method implemented by a network edge node. The method includes adding a header including a flags field and a data field including a first metadata to a first packet, setting a first flag in the flags field of the first header to a first value to indicate that the first packet is a forward flow packet, transmitting the first packet towards a second network edge node, receiving a second packet including the first metadata in the data field and a second flag in the flags field set to the first value to indicate that the second packet is a reverse flow packet, generating a second metadata corresponding to receipt of the second packet; and transmitting an export message that includes the first metadata and the second metadata toward a controller.

The disclosed method provides a feedback mechanism implemented as a standalone approach (e.g., as an embodiment of data plane telemetry application in IFIT framework) for calculating RTT between network edge nodes and hence, solve one or more of the problems associated with monitoring and measuring in-band edge-to-edge performance of the network as described below. Therefore, the disclosed method makes the measurements accurate and supports various network-based traffic engineering and load balancing algorithms.

In a first implementation form of the method according to the third aspect or any other implementation of the third aspect, the header is added to the first packet in accordance with an instruction received from the controller.

In a second implementation form of the method according to the third aspect or any other implementation of the third aspect, the flags field is a part of an existing field in the header of the first packet.

In a third implementation form of the method according to the third aspect or any other implementation of the third aspect, the flags field is a new field that is added in the first packet.

In a fourth implementation form of the method according to the third aspect or any other implementation of the third aspect, the first header is an in-situ operations, administration, and maintenance (IOAM) edge-to-edge (E2E) option header.

In a fifth implementation form of the method according to the third aspect or any other implementation of the third aspect, the method further includes generating, by a clock at the network edge, a first timestamp corresponding to the first packet, wherein the first timestamp represents a time at which the packet was received by the network edge node.

In a sixth implementation form of the method according to the third aspect or any other implementation of the third aspect, the second metadata comprises a second timestamp corresponding to the second packet, and wherein the second timestamp represents a time at which the packet was received by the network edge node.

In a seventh implementation form of the method according to the third aspect or any other implementation of the third aspect, the method further includes the transmitting the first timestamp and the second timestamp to the controller.

In an eighth implementation form of the method according to the third aspect or any other implementation of the third aspect, the method includes determining a round-trip time (RTT) between the network edge node and the second network edge node based on a difference between the first timestamp and the second timestamp.

In a ninth implementation form of the method according to the third aspect or any other implementation of the third aspect, the network edge node is an ingress network edge node and the second network edge node is an egress network edge node.

A fourth aspect relates to a network edge node that includes a memory including instructions; a processor coupled to the memory, the processor configured to implement the instructions to cause the network edge node to add a first in-situ operations, administration, and maintenance (IOAM) edge-to-edge (E2E) option header including a flags field and an IOAM E2E option data field including a first metadata to a first IOAM E2E option packet, and set a first flag in the flags field of IOAM E2E option packet to a first value to indicate that the first IOAM E2E option packet is a forward flow packet, a transmitter coupled to the processor, the transmitter configured to transmit the first IOAM E2E option packet towards a second network edge node, and a receiver coupled to the transmitter, the receiver configured to receive a second IOAM E2E option packet including the first metadata in the IOAM E2E option data field and a second flag in the flags field set to the first value to indicate that the second IOAM E2E option packet is a reverse flow packet, wherein the processor is further configured to generate a second metadata corresponding to receipt of the second IOAM E2E option packet, and wherein the transmitter is further configured to transmit an export message that includes the first metadata and second metadata toward a controller.

The network edge node provides a feedback mechanism implemented as an extension to the existing IOAM standard (e.g., IOAM E2E option) that solve one or more of the problems associated with monitoring and measuring in-band edge-to-edge performance of the network as described below. Therefore, the disclosed method makes the measurements accurate and supports various network-based traffic engineering and load balancing algorithms.

A fifth aspect relates to a network edge node that includes a memory including instructions; a receiver coupled to the memory, the receiver configured to receive a first in-situ operations, administration, and maintenance (IOAM) edge-to-edge (E2E) option packet including a flags field and an IOAM E2E option data field including a first metadata, wherein the flags field includes a first flag having a first value to indicate that the first IOAM E2E option packet is a forward flow packet, a processor coupled to the receiver and the memory, the processor configured to implement the instructions to cause the network edge node to generate a second IOAM E2E option packet based on receipt of the first IOAM E2E packet including the first flag with the first value, wherein the second E2E IOAM option packet includes the first metadata in the IOAM E2E option data field and a second flag in the flags field set to the first value to indicate that the second IOAM E2E option packet is a feedback packet; and a transmitter coupled to the processor, the transmitter configured to transmit the second IOAM E2E option packet towards a second network edge node.

The network edge node provides a feedback mechanism implemented as an extension to the existing IOAM standard (e.g., IOAM E2E option) that solve one or more of the problems associated with monitoring and measuring in-band edge-to-edge performance of the network as described below. Therefore, the disclosed method makes the measurements accurate and support various network-based traffic engineering and load balancing algorithms.

A sixth aspect relates to a network edge node that includes a memory including instructions; a processor coupled to the memory, the processor configured to implement the instructions to cause the network edge node to add a first header including a flags field and a data field including a first metadata to a first packet and set a first flag in the flags field of the first header to a first value to indicate that the first packet is a forward flow packet, a transmitter coupled to the processor, the transmitter configured to transmit the first packet towards a second network edge node, and a receiver coupled to the transmitter, the receiver configured to receive a second packet including the first metadata in the data field and a second flag in the flags field set to the first value to indicate that the second packet is a reverse flow packet, wherein the processor is further configured to generate a second metadata corresponding to receipt of the second packet, and wherein the transmitter is further configured to transmit an export message that includes the first metadata and second metadata toward a controller.

The network edge node provides a feedback mechanism implemented as a standalone approach (e.g., as an embodiment of data plane telemetry application in IFIT framework) for calculating RTT between network edge nodes and hence, solve one or more of the problems associated with monitoring and measuring in-band edge-to-edge performance of the network as described below. Therefore, the disclosed method makes the measurements accurate and supports various network-based traffic engineering and load balancing algorithms.

A seventh aspect relates to a non-transitory computer readable medium comprising a computer program product for use by a network edge node, the computer program product comprising computer executable instructions stored on the non-transitory computer readable medium such that when executed by a processor cause the network edge node to perform the method according to the first aspect.

An eighth aspect relates to a non-transitory computer readable medium comprising a computer program product for use by a network edge node, the computer program product comprising computer executable instructions stored on the non-transitory computer readable medium such that when executed by a processor cause the network edge node to perform the method according to the second aspect.

A ninth aspect relates to non-transitory computer readable medium comprising a computer program product for use by a network edge node, the computer program product comprising computer executable instructions stored on the non-transitory computer readable medium such that when executed by a processor cause the network edge node to perform the method according to the third aspect.

A tenth aspect relates to network edge node that includes a storage means including instructions; a processing means coupled to the storage means, the processing means configured to implement the instructions to cause the network edge node to add a first in-situ operations, administration, and maintenance (IOAM) edge-to-edge (E2E) option header including a flags field and an IOAM E2E option data field including a first metadata to a first IOAM E2E option packet and set a first flag in the flags field of IOAM E2E option packet to a first value to indicate that the first IOAM E2E option packet is a forward flow packet, a transmitting means coupled to the processing means, the transmitting means configured to transmit the first IOAM E2E option packet towards a second network edge node, and a receiving means coupled to the transmitter, the receiving means configured to receive a second IOAM E2E option packet including the first metadata in the IOAM E2E option data field and a second flag in the flags field set to the first value to indicate that the second IOAM E2E option packet is a reverse flow packet, wherein the processing means is further configured to generate a second metadata corresponding to receipt of the second IOAM E2E option packet, and wherein the transmitting means is further configured to transmit an export message that includes the first metadata and second metadata toward a controller.

An eleventh aspect relates to network edge node that includes a storage means including instructions; a receiving means coupled to the storage means, the receiver configured to receive a first in-situ operations, administration, and maintenance (IOAM) edge-to-edge (E2E) option packet including a flags field and an IOAM E2E option data field including a first metadata, wherein the flags field includes a first flag having a first value to indicate that the first IOAM E2E option packet is a forward flow packet, a processing means coupled to the receiving means and the storage means, the processing means configured to implement the instructions to cause the network edge to generate a second IOAM E2E option packet based on receipt of the first IOAM E2E packet including the first flag with the first value, wherein the second E2E IOAM option packet includes the first metadata in the IOAM E2E option data field and a second flag in the flags field set to the first value to indicate that the second IOAM E2E option packet is a feedback packet, and a transmitting means coupled to the processing means, the transmitting means configured to transmit the second IOAM E2E option packet towards a second network edge node.

A twelfth aspect relates to network edge node that includes a storage means including instructions; a processing means coupled to the storage means, the processing means configured to implement the instructions to cause the network edge node to add a first header including a flags field and a data field including a first metadata to a first packet and set a first flag in the flags field of the first header to a first value to indicate that the first packet is a forward flow packet, a transmitting means coupled to the processing means, the transmitting means configured to transmit the first packet towards a second network edge node; and a receiving means coupled to the transmitter, the receiving means configured to receive a second packet including the first metadata in the data field and a second flag in the flags field set to the first value to indicate that the second packet is a reverse flow packet, wherein the processing means is further configured to generate a second metadata corresponding to receipt of the second IOAM E2E option packet, and wherein the transmitting means is further configured to transmit an export message that includes the first metadata and second metadata toward a controller.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a diagram of an extended in-situ OAM (IOAM) edge-to-edge (E2E) option header according to an embodiment of the disclosure.

FIG. 4 is a method implemented by a network edge node in an INT system according to an embodiment of the disclosure.

FIG. 5 is a method implemented by a network edge node in an INT system according to an embodiment of the disclosure.

FIG. 6 is a method implemented by a network edge node in an INT system according to an embodiment of the disclosure.

DETAILED DESCRIPTION

Figure 1:
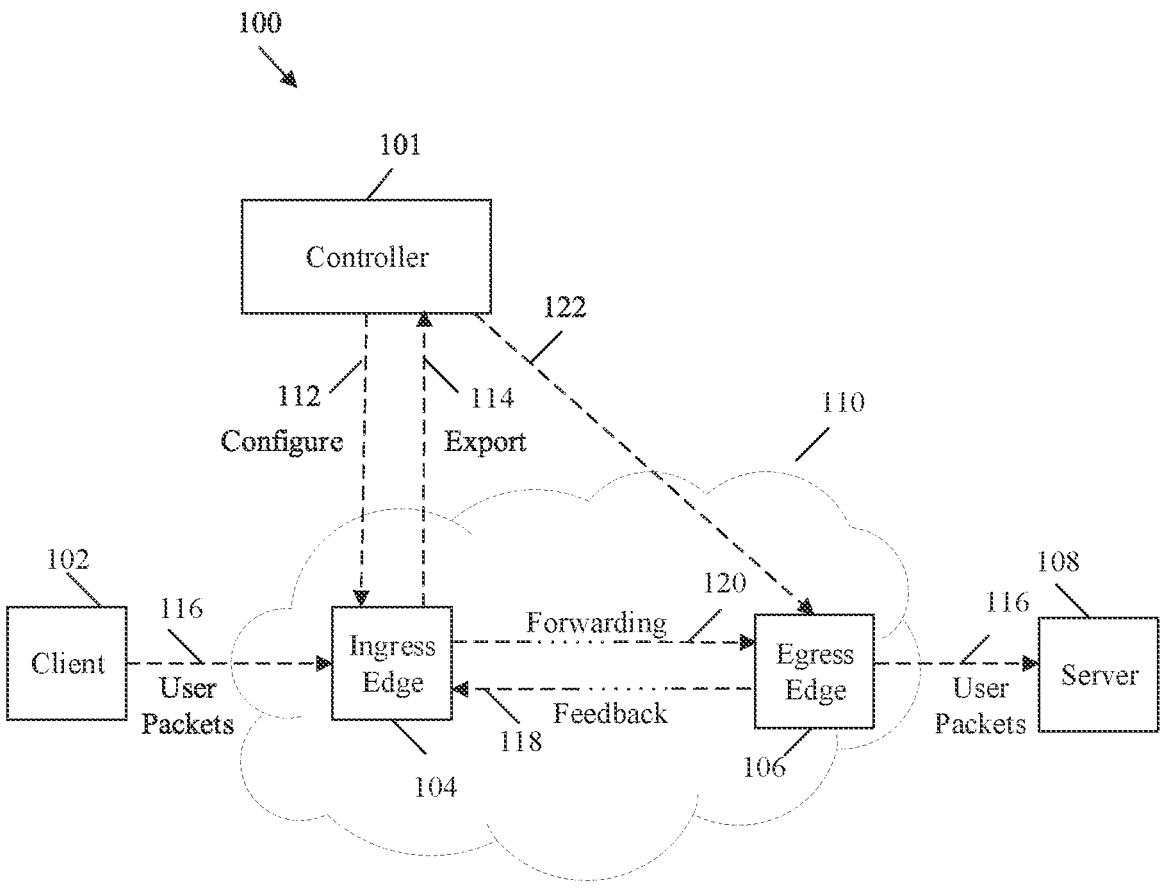
FIG. 1 is a diagram illustrating an in-band network telemetry (INT) system according to an embodiment of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A network edge is a node configured to route packets, encapsulate and/or de-capsulate the packets, and implement instructions received from a controller. A packet (a.k.a., a data packet, a user packet etc.) refers a unit of data that moves along a given network path. A header includes information used to route a packet from a source to a destination. An ingress edge node is a network edge node (e.g., a router) disposed at an ingress point of a network and is a starting point for a packet on a network path. An egress edge node is a network edge node (e.g., router) disposed at an egress point of a network and is an end point for a packet. A round-trip time (RTT) is the length of time it takes for a packet to be sent from an ingress edge to an egress edge plus the time it takes for an acknowledgement of that packet (e.g., a reverse flow packet, a feedback packet, etc.) to be received back at the ingress edge. An IOAM E2E option header is a header that may applied to a packet. An IOAM data field (e.g., an IOAM E2E option data field) is a set of bits with a defined format and meaning, which can be stored at a certain place in a packet for the purpose of IOAM. A timestamp represents a time at which a packet was transmitted/received by a network edge node. An identifier represents a sequence number or a random number corresponding to a packet.

The following acronyms are used herein, operations, administration, and maintenance (OAM), in-situ OAM (IOAM), edge-to-edge (E2E), round-trip time (RTT), in-band telemetry (INT), two-way active measurement protocol (TWAMP), identifier (ID), internet control message protocol version 6 (ICMPv6), in-situ flow information telemetry (IFIT), internet engineering task force (IETF), request for comments (RFC), and access control list (ACL).

As described in the background section, OAM includes the processes, activities, tools, and standards used to operate, administer, manage, and maintain a system, such as a telecommunications network. As described in IETF document draft-song-opsawg-ifit-framework-12 entitled "In-situ Flow Information Telemetry," dated Apr. 14, 2020, efficient network operation increasingly relies on high-quality data-plane telemetry to provide the necessary visibility. Traditional OAM processes, which include proactive and reactive techniques, running both active and passive modes, are no longer sufficient to meet the monitoring and measurement requirements. The complexity of today's networks and service quality requirements demand new high-precision and real-time techniques.

Emerging INT techniques can provide high-precision flow insight and real-time network issue notification (e.g., jitter, latency, packet loss, significant bit error variations, and unequal load-balancing). INT refers to the data-plane telemetry techniques that directly tap and measure network traffic by embedding instructions or metadata into packets.

IOAM is an example implementation of INT. IOAM mechanisms, which are sometimes also referred to as embedded network telemetry, can complement active probe-based mechanisms such as ping or traceroute, which are sometimes considered "out-of-band," because the messages are transported independently from regular data traffic.

One downside to these existing out-of-band active measurement approaches is that host-based ping ICMPv6, which is defined in IETF document RFC 4443 entitled "Internet Control Message Protocol (ICMPv6) for the Internet Protocol Version 6 (IPv6) Specification," dated March 2006, is beyond the access of network operators, and router-based ping is unable to reflect the real performance of specific flows. For example, the active measurement approaches are unable to measure an E2E RTT of a packet, which can result in network congestion, packet loss, and/or inaccurate measurement data. As another example, another active measurement approach such as TWAMP as defined in IETF document RFC 5357 entitled "A Two-Way Active Measurement Protocol (TWAMP)," dated and described in IETF document entitled "A Two-Way Active Measurement Protocol (TWAMP)," dated October 2008 also does not reflect the real performance of specific flows.

Some of the existing IOAM options, such as IOAM Trace option type with loopback and IOAM E2E option type, offer measurement approaches that support in-band flow-based performance measurements. However, the IOAM trace option type with loopback is inefficient for the applications that do not care about the per-hop performance, and the IOAM E2E option type only supports one-way measurement. As another example, the alternate marking (AM) measurement approach as defined in IETF document RFC 8321 entitled "Alternate-Marking Method for Passive and Hybrid Performance Monitoring," dated January 2018 and described in IETF document draft draft-ietf-ippm-alt-mark-14 entitled "Alternate Marking method for passive and hybrid performance monitoring" dated Dec. 7, 2017 may be used to measure the two-way E2E delay. However, the alternate marking measurement interval needs to be large enough to avoid the ambiguity, and it also needs both network edge nodes for a flow to conduct the measurement and export results to a controller. As such, these existing out-of-band OAM and IOAM performance measurement approaches fail to measure and monitor particular flows' E2E performance in the operator's network domain, thereby limiting the capability to manage and identify problems in the network in real-time.

Disclosed herein are techniques that provide a feedback mechanism for monitoring and measuring in-band E2E network performance in real-time. This approach may be implemented as an extension to the existing IOAM standard (e.g., IOAM E2E option augmented with the feedback mechanism) or as a standalone approach (e.g., as an embodiment of data plane telemetry application in IFIT framework) for calculating RTT between network edge nodes and hence, reduces the network congestion. A network can implement the feedback mechanism by employing a controller in communication with the network edge nodes. The controller (either on a remote machine or on a network edge node's control plane (e.g., local controller)) may configure the ingress network edge node to measure RTT associated with packets between the ingress network edge node and the egress network edge node. The ingress network edge node may use ACL to filter the flow packets and, at a given interval or probability, add flags and metadata to selected packets. The egress network edge node, after capturing the metadata, either piggybacks the metadata on a reverse flow packet, or generates a feedback packet carrying the metadata back to the ingress network edge node. The ingress network edge node then sends an export message that includes the metadata along with a current timestamp to the controller. The controller can then calculate the flow RTT between the ingress network edge node and the egress network edge node.

Because the metadata incur only in small and fixed header overhead, and the network edge nodes do not need to do any additional processing, the disclosed methods may make the measurements accurate and have little impact on the network forwarding performance. Such E2E RTT measurement only reflects a network delay for a flow but excludes an application layer delay incurred by a server or a client. In addition, these mechanisms may support various network-based traffic engineering and load balancing algorithms. These approaches may further prevent a denial of service (DoS) attack and data tampering. Furthermore, depending on an application scenario and a network domain scope, a network edge node may extend to a host, a network interface card (NIC), a network switch, or a router. The mechanisms may apply on all network environments such as data center networks, enterprise networks, and carrier backbone networks.

FIG. 1 is a diagram illustrating an in-band network telemetry (INT) system 100 according to an embodiment of the disclosure. The system 100 may include a controller 101, a client 102, network edge nodes 104 and 106, a server 108, and a communications network 110. The system 100 may also include other devices in practical applications. The controller 101 (a.k.a., network controller) is in communication with at least one of the network edge nodes 104 (represented by the arrow 112 from the controller 101 to the network edge node 104) and 106 (represented by the arrow 122 from the controller 101 to the network edge node 104). The communication may be performed through wired links, wireless links, an interface, or some other type of connection or communication medium. The controller 101 may be configured to apply specific configurations and send various instructions to the network edge nodes 104 and 106 to facilitate the feedback process 118 in the communications network 110.

The client 102 (a.k.a., a source) may represent a user device such as a personal computer, laptop, mobile phone, tablet, smart watch, and so on. The client 102 may be configured to forward user packets ((a.k.a., packets) 116 into the communications network 110 toward the network edge node 104.

Each of the network edge nodes 104 and 106 may comprise a router, switch, bridge, or other network device configured to route the packets, add or remove the data fields to the packets, implement instructions received from the controller 110, and transmit the user packets 118 to the server 108 (a.k.a., a destination). In an embodiment, the network edge node 104 may be an ingress network edge node and the network edge node 106 may be an egress network edge node. In an embodiment, the network edge nodes 104 and 106 may be a part of a particular IOAM domain, e.g., IOAM E2E option domain.

The server 108 is configured to receive the user packets 116 from, for example, the network edge node 106 at the end of the path. The server 108 may represent a data center, content store, or any other device capable of requesting the packets 116.

The communications network 110 may be communicatively coupled to the client 102 and the server 108. In an example, the communications network 110 may be configured as a transport network which forwards user communications between the network edge nodes 104 and 106. Such user communications include streams of the user packets 116 organized into flows. A communications network 110 may support many simultaneous communications, some of which are bidirectional.

From the foregoing, it should be recognized that the controller 101 applies specific configurations and sends various instructions to the network edge nodes 104 and 106, and facilitate the feedback process 118 in the communications network 110. To configure the network edge node 104 (represented by the arrow 112 from the controller 101 to the network edge node 104), the controller 101 may apply access control list (ACL) filtering to filter and periodically select a set of target flow packets from the user packets 116 received from the client 102 based on predetermined parameters. The predetermined parameters include a sampling interval and/or a sampling probability. The controller 101 may further monitor the filtered target flow packets at a monitoring frequency or a monitoring interval to select a set of sampled flow packets.

The network edge node 104 may be configured to receive the packets 116 entering the communications network 110 from the client 102. The network edge node 104 may determine or identify a first packet from the set of target flow packets in accordance with an instruction received from the controller 101. Once the first packet has been determined or identified, the network edge node 104 may add a header to the first packet in accordance with the instruction received from the controller 101. In one example, the header may be an extended IOAM E2E option header 200, as shown in FIG. 2.

FIG. 2 is a diagram of an extended IOAM edge-to-edge (E2E) option header 200 included in packets according to an embodiment of the disclosure. In an embodiment, the disclosed mechanisms may be implemented as an extension to the existing IOAM standard (e.g., IOAM E2E option).

As show in FIG. 2, the IOAM E2E option header 200 may include a namespace-id field 202, a flags field 204, an IOAM E2E type field 206, and an IOAM E2E option data field 208. As described in IETF document draft-ietf-ippm-ioam-data-10 entitled "Data Fields for In-situ OAM," dated Jul. 13, 2020, the namespace-id field 202 is a 16-bit identifier of an IOAM-namespace, the IOAM E2E type field 206 is a 16-bit identifier that specifies which data types are used in the E2E option data field, and the IOAM E2E option data field 208 is a 4-octet variable-length field.

The flags field 204 of the IOAM E2E option header 200 may be incorporated into different fields of the IOAM E2E option header 200. For example, in an embodiment, the flags field 204 may be a part of the namespace-id field 202 or other fields in the IOAM E2E option header 200 added to the first packet. In another embodiment, the flags field 204 may be a new field that is added to the first packet. The flags field 204 is a 4-bit field that defines a plurality of flags. The two bits of the flags field 204 may be used to indicate forward flow packets, reverse flow packets, or feedback packets for the two-way measurement. The remaining bits in the flags field 204 may remain undefined for future use.

In an embodiment, the IOAM E2E option data field 208 may include metadata. The metadata may include, but is not limited to, a first ID, a first timestamp, and/or additional metadata corresponding to the first packet identified from the set of target flow packets.

Referring back to FIG. 1, in an embodiment, the metadata may uniquely identify the first packet transmitted from the network edge node 104. In an embodiment, the metadata comprises the first ID. The first ID may include a sequence number or a random number. In an embodiment, the metadata comprises a first timestamp. The first timestamp may be generated, using a clock at the network edge node 104, corresponding to a time at which the first packet was received by the network edge node 104. In one case, the first timestamp may be stored locally (e.g., at the network edge node 104) to prevent the first timestamp from being maliciously altered during the forwarding of the packets.

The network edge node 104 sets a first flag (a.k.a., a bit) to a first value and a second flag to a second value in the flags field 204 to indicate that the first packet is a forward flow packet requesting for a feedback. For example, the first flag sets to a value "1" and the second flag sets to a value "0" to indicate that the first packet is the forward flow packet requesting feedback. The network edge node 104 also inserts the metadata corresponding to the first packet into the E2E option data field 208. The network edge node 104 may forward 120 the first packet with the flags field 204 and the metadata in the E2E option data field 208 towards the second network edge node 106.

The second network edge node 106 may be configured to receive the first packet from the network edge node 104. In an embodiment, the second network edge node 106 may read the flags field and the metadata added to the header of the received first packet. In an embodiment, the second network edge node 106 may remove the header of the received first packet prior to forwarding the first packet to the server 108. The server 108 can then analyze or otherwise use the first packet.

In an embodiment, the second network edge node 106 reads the value of the flags field and determines that the network edge node 104 has requested feedback (e.g., the first flag value is set to 1 and the second flag value is set to 0). The second network edge node 106 also retrieves the metadata from the E2E option data field 208 and may locally store that metadata.

The second network edge node 106 is able to provide the requested feedback through a variety of different scenarios. In a first scenario, the second network edge node 106 receives a second packet (a.k.a., a reverse flow packet or a returning packet) from the server 108. In such a case, the second packet may be any random packet (or the first packet) returning back from the server 108 towards the second network edge node 106. The second network edge node 106 adds the IOAM E2E option header 200 to the second packet and then copies the stored metadata (e.g., the first ID and/or the first timestamp) into the E2E option field 208. The second network edge node 106 sets the first flag to the second value and the second flag to the first value in the flags field 204 to indicate that the second packet is the requested feedback. For example, the first flag sets to a value "0" and the second flag sets to a value "1" to indicate that the second packet is the requested feedback. The second network edge node 106 sends the second packet back to the network edge node 104.

In a second scenario, the second network edge node 106 may generate a second packet (e.g., the feedback packet). The second network edge node 106 adds the IOAM E2E option header 200 to the second packet and then copies the stored metadata (e.g., the first ID and/or the first timestamp) into the E2E option field 208. The second network edge node 106 sets the first flag to the second value and the second flag to the first value in the flags field 204 to indicate that the generated second packet is the requested feedback. For example, the first flag sets to a value "0" and the second flag sets to a value "1" to indicate that the second packet is the requested feedback. The second network edge node 106 sends the second packet back to the network edge node 104.

In a third scenario, the second network edge node 106 may also wants to calculate a reverse RTT between the second network edge node 106 and the network edge node 104 in a reverse direction. In such an embodiment, the second network edge node 106 may set value of both the first flag and the second flag to the second value in the flags field 204 of the second packet to indicate that the second packet (e.g., the reverse flow packet or the feedback packet) requesting reverse feedback. For example, the first flag sets to a value "1" and the second flag sets to a value "1" to indicate that the second packet requesting reverse feedback. The second network edge node 106 adds the IOAM E2E option header 200 to the second packet and then copies the stored metadata into the E2E option field 208. The second network edge node 106 then sends the second packet to the network edge node 104. The network edge node 104 will receive the second packet. The network edge node 104 reads the value of the flags field and determines that the second network edge node 106 has requested reverse feedback (e.g., the first flag value is set to 1 and the second flag value is set to 1). The network edge node 104 will send the second packet back to the second network edge 106. The second network edge node 106 will receive the original second packet to calculate the reverse RTT in the reverse direction. In this way, a single packet (e.g., the second packet) can calculate the reverse RTT in real-time.

The second packet, in any scenario (e.g., the first scenario, the second scenario, or the third scenario) described above, may further include a second ID and flow statistics corresponding to the second network edge node 106. The second ID in the second packet may be useful in case there are multiple possible paths (e.g., multiple egress network edge nodes) toward the server 108.

The network edge node 104 is configured to receive the second packet from the second network edge node 106. The network edge node 104 may match the first metadata (e.g., first ID) stored locally at the network edge node 104 with the copy of the metadata captured from the second packet to correlate the first packet with the second packet (e.g., the reverse flow packet or the feedback packet). The network edge node 104 may generate a second metadata corresponding to receipt of the second packet. The second metadata may comprise a second timestamp that specifies a current time at which the second packet (e.g., the reverse flow packet or the feedback packet) was received by the network edge node 104.

The network edge node may transmit an export message 114 that includes the first timestamp (e.g., locally stored timestamp or received from the metadata of the second packet) and a second timestamp to the controller 101. The controller 101 may be configured to calculate the RTT between the network edge node 104 and the second network edge node 106 based on a difference between the first timestamp and the current timestamp. Comparing timestamps taken on different network edge nodes in the network makes it possible to measure delays in real-time. These E2E round-trip delays may improve monitoring and measuring network performances with an adequate accuracy in network-based applications (e.g., traffic engineering or load balancing).

In an embodiment, in case of multi-homing, the second packet returning back to the client may go through different ingress network edges. In this case, the multi-homing ingress network edge nodes may merge and share a same controller (e.g., controller 101). The ingress network edge nodes may report all the forward packet timestamps and return packet timestamps to the controller. The controller may conduct the RTT calculation based on a difference between forward packet timestamps and return packet timestamps to measure network delays in real-time.

Figure 3:
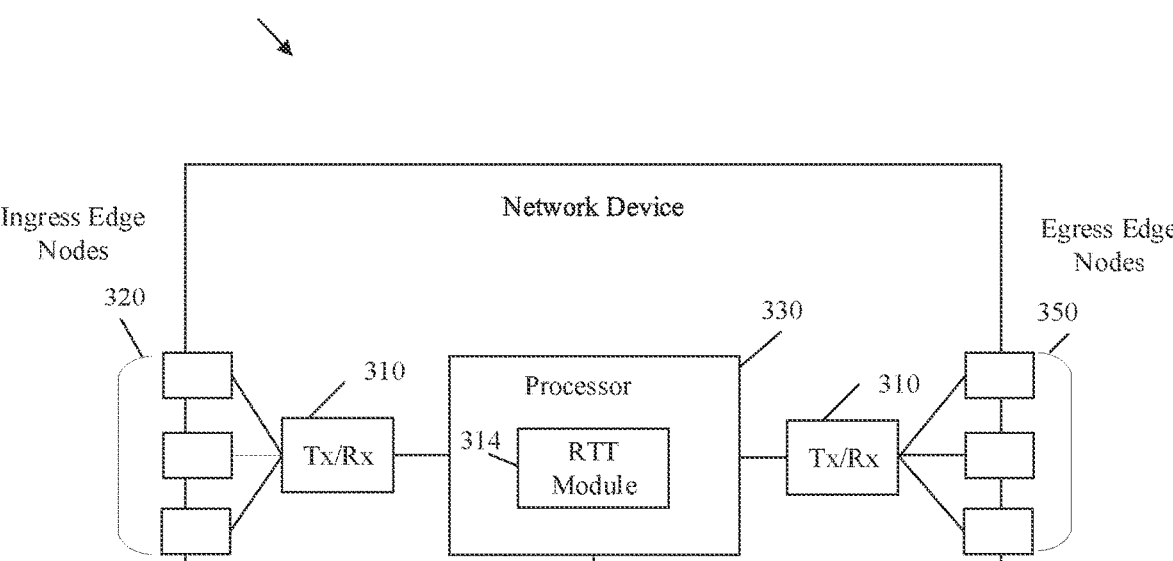
FIG. 3 is a schematic diagram of a network device in an INT system according to an embodiment of the disclosure.

FIG. 3 is a schematic diagram of a network device 300 according to an embodiment of the disclosure. The network device 300 is suitable for implementing the methods and processes disclosed herein. The network device 300 comprises ingress edge nodes 320, egress edge nodes 350, and/or transceiver units (Tx/Rx) 310, including transmitters and/or receivers for receiving and transmitting data over a network. The network device 300 also includes a processor 330 including a logic unit and/or central processing unit (CPU) to process the data and a memory 360 for storing the data. The network device 300 may also comprise electrical, optical-to-electrical (OE) components, electrical-to-optical (EO) components, and/or wireless communication components coupled to the ingress edge nodes 320 and/or the egress edge nodes 350 for communication of data via electrical, optical, or wireless communication networks.

The processor 330 is implemented by hardware and software. The processor 330 may be implemented as one or more CPU chips, cores (e.g., as a multi-core processor), field-programmable gate arrays (FPGAs), application specific integrated circuits (ASICs), and digital signal processors (DSPs). The processor 330 is in communication with the ingress edge nodes 320, Tx/Rx 310, the egress edge nodes 350, and the memory 360. The processor 330 comprises an RTT module 314. The RTT module 314 implements all or part of the disclosed embodiments described herein. For example, the RTT module 314 can be employed to implement feedback mechanisms in a controller 101, ingress network edge node 104, and egress network edge node 106, depending on the example. For example, the RTT module 314 may add a first header including a flags field and a data field including a first metadata to a first packet, set a first flag in the flags field of the first header to a first value to indicate that the first packet is a forward flow packet, transmit the first packet towards a second network edge node, receive a second packet including the first metadata in the IOAM E2E option data field and a second flag in the flags field set to the first value to indicate that the second IOAM E2E option packet is a reverse flow packet, generate a second metadata corresponding to receipt of the second IOAM E2E option packet; and transmit an export message that includes the first metadata and the second metadata toward a controller in order to measure E2E RTT. This improves monitoring and measuring network performances in a communications network 110. The RTT module 314 may also implement any other method/mechanism described herein. Hence, the RTT module 314 causes the network device 300 to provide additional functionality and/or flexibility when managing the communications network. As such, the RTT module 314 improves the functionality of the network device 300 as well as addresses problems that are specific to the telecommunication arts. Further, the RTT module 314 effects a transformation of the network device 300 to a different state. Alternatively, the RTT module 314 can be implemented as instructions stored in the memory 360 and executed by the processor 330 (e.g., as a computer program product including computer instructions stored on a non-transitory medium which, when executed, prompt a device to perform steps of a corresponding method).

The network device 300 may also include input and/or output (I/O) devices for communicating data to and from a user. The I/O devices may include output devices such as a display for displaying video data, speakers for outputting audio data, etc. The I/O devices may also include input devices, such as a keyboard, mouse, trackball, etc., and/or corresponding interfaces for interacting with such output devices.

The memory 360 comprises one or more memory types such as disks, tape drives, and solid-state drives and may be used as an over-flow data storage device, to store programs when such programs are selected for execution, and to store instructions and data that are read during program execution. The memory 360 may be volatile and non-volatile and may be read-only memory (ROM), random-access memory (RAM), ternary content-addressable memory (TCAM), and static random-access memory (SRAM).

FIG. 4 is a method 400 implemented by a network edge node (e.g., an ingress edge node 104) according to an embodiment of the disclosure. The method 400 may be performed to measure in band E2E RTT and improve monitoring and measuring network performances in a communications network. The method 400 may be implemented as an extension to the existing IOAM E2E option.

In block 402, a first IOAM E2E option header including a flags field and an IOAM E2E option data field including a first metadata is added to a first IOAM E2E option packet in accordance with an instruction received from the controller. In an embodiment, the first IOAM E2E option header further comprises a namespace-id field and an IOAM E2E type field. In an embodiment, the flags field is a part of the namespace-id field in the IOAM E2E option header. In an embodiment, the flags field is a new field that is added in the first IOAM E2E option packet. In an embodiment, the first metadata comprises a first identifier and/or a first timestamp corresponding to the IOAM 2E option first packet, wherein the first identifier comprises a sequence number or a random number, and wherein the first timestamp represents a time at which the packet was received by the network edge node 104. In an embodiment, the network edge node 104 is an ingress network edge node.

In block 404, a first flag in the flags field of the first IOAM E2E option packet is set to a first value to indicate that the first IOAM E2E option packet is a forward flow packet requesting for a feedback.

In block 406, the first IOAM E2E option packet is transmitted towards a second network edge 106. In an embodiment, the second network edge node is an egress network edge node.

In block 408, a second IOAM E2E option packet is received by the network edge node 104. In an embodiment, a second IOAM E2E option packet including the first metadata in the IOAM E2E option data field and a second flag in the flags field set to the first value to indicate that the second IOAM E2E option packet is a reverse flow packet.

In block 410, a second metadata corresponding to receipt of the second IOAM E2E option packet is generated. The second metadata may comprise a second timestamp that specifies a current time at which the second packet (e.g., the reverse flow packet) was received by the network edge node 104.

In block 412, the first metadata and the second metadata are transmitted toward a controller. In an embodiment, the network edge node 104 may transmit an export message 114 that includes the first timestamp and the second timestamp to the controller 101 to calculate the RTT. In an embodiment, the RTT is determined between the network edge node and the second network edge node based on a difference between the first timestamp and the second timestamp.

FIG. 5 is a method 500 implemented by a network edge node (e.g., an egress edge node 106) according to an embodiment of the disclosure. The method 500 may be performed to generate a feedback packet and measure E2E RTT in a communications network. The method 500 may be implemented as an extension to the existing IOAM E2E option.

In block 502, a first in-situ operations, administration, and maintenance (IOAM) edge-to-edge (E2E) option packet including a flags field and an IOAM E2E option data field including a first metadata is received by the network edge node 106. In an embodiment, the flags field includes a first flag having a first value to indicate that the first IOAM E2E option packet is a forward flow packet requesting for a feedback.

In block 504, a second IOAM E2E option packet based on receipt of the first IOAM E2E packet including the first flag with the first value is generated. In an embodiment, the second E2E IOAM option packet includes the first metadata in the IOAM E2E option data field and a second flag in the flags field set to the first value to indicate that the second IOAM E2E option packet is a feedback packet.

In block 506, the second IOAM E2E option packet is transmitted towards a second network edge node. In an embodiment, the second network edge node is an ingress network edge node 104. In an embodiment, the second metadata comprises an identifier and a timestamp corresponding to the second IOAM E2E option packet. In an embodiment, the second identifier comprises a sequence number or a random number, and the second timestamp represents a time at which the packet was received by the second network edge node.

FIG. 6 is a method 600 implemented by a network edge node (e.g., an ingress edge node 104) according to an embodiment of the disclosure. The method 600 may be performed to measure E2E RTT and improve monitoring and measuring network performances in a communications network. The method 600 may be implemented as a stand-alone approach.

In block 602, a first header including a flags field and a data field including a first metadata is added to a first packet in accordance with an instruction received from the controller. In an embodiment, the first header comprises a flags field. In an embodiment, the flags field is a part of an existing field in the header of the first packet. In an embodiment, the flags field is a new field that is added in the first packet. In an embodiment, the first metadata comprises a first identifier and/or a first timestamp corresponding to the first packet, wherein the first identifier comprises a sequence number or a random number, and wherein the first timestamp represents a time at which the packet was received by the network edge node.

In block 604, a first flag in the flags field of the packet is set to a first value to indicate that the first packet is a forward flow packet.

In block 606, the first packet is transmitted towards a second network edge node. In an embodiment, the second network edge node is an egress network edge node 106.

In block 608, a second packet is received by the network edge node 104. The second network packet may include the first metadata in the data field and a second flag in the flags field set to the first value to indicate that the second packet is a reverse flow packet.

In block 610, a second metadata corresponding to receipt of the second packet is generated. The second metadata may comprise a second timestamp that specifies a current time at which the second packet (e.g., the reverse flow packet) was received by the network edge node 104.

In block 612, the first metadata and the second metadata are transmitted toward a controller. The network edge node 104 may transmit an export message 114 that includes the first timestamp and the second timestamp to the controller 101 to calculate the RTT. In an embodiment, the RTT is determined between the network edge node and the second network edge node based on a difference between the first timestamp and the second timestamp.

Figure 7:
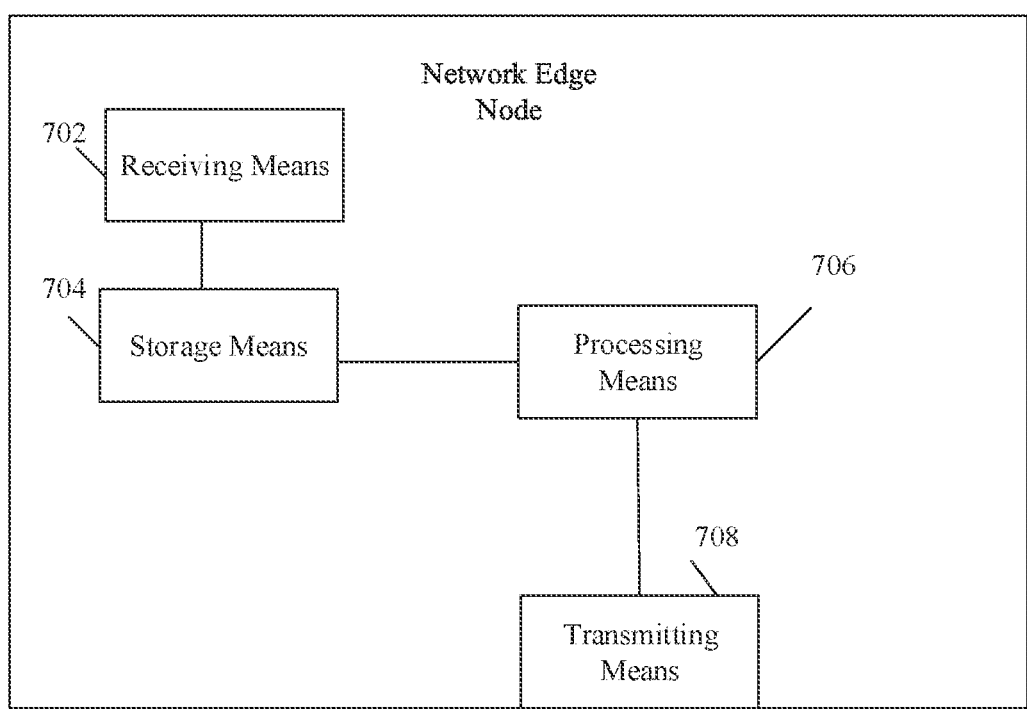
FIG. 7 is a schematic diagram of means for determining a round-trip time in an INT system according to an embodiment of the disclosure.

FIG. 7 is a schematic diagram of a means for determining a round-trip time in an INT system according to an embodiment of the disclosure. The means for network edge node 700 includes receiving means 702, for example receiver units 310; transmitting means 708, for example transmitter units 310; and processing means 706, for example processor 330. The processing means 702 may be configured to add a first header including a flags field and a data field including a first metadata to a first packet and set a first flag in the flags field of the first header to a first value to indicate that the first packet is a forward flow packet. The processing means 706 may be coupled to the transmitting means 708. The transmitting means 708 may be configured to transmit the first packet towards a second network edge node. The transmitting means 708 may be coupled to the storage means 704. The storage means 704 may be configured to store instructions. The storage means 704 may be coupled to the receiving means 702. The receiving means 702 may be configured to receive a second packet including the first metadata in the IOAM E2E option data field and a second flag in the flags field set to the first value to indicate that the second IOAM E2E option packet is a reverse flow packet. The processing means 702 may be further configured to generate a second metadata corresponding to receipt of the second IOAM E2E option packet. The transmitting means 708 may be further configured to transmit an export message that includes the first metadata and the second metadata toward a controller. The modules of the network edge node 700 can also be employed to perform any of the steps/items described above with respect to methods 400, 500, and/or 600.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a network edge node, comprising:

adding a first in-situ operations, administration, and maintenance (IOAM) edge-to-edge (E2E) option header including a flags field and an IOAM E2E option data field including a first metadata to a first IOAM E2E option packet;

setting a first flag in the flags field of the IOAM E2E option packet to a first value to indicate that the first IOAM E2E option packet is a forward flow packet;

transmitting the first IOAM E2E option packet towards a second network edge node;

receiving a second IOAM E2E option packet including the first metadata in the IOAM E2E option data field and a second flag in the flags field set to the same first value as the first flag to indicate that the second IOAM E2E option packet is a reverse flow packet;

generating a second metadata corresponding to receipt of the second IOAM E2E option packet; and transmitting an export message that includes the first metadata and the second metadata toward a controller.

2. The method of claim 1, wherein the IOAM E2E option header is added to the first IOAM E2E option packet in accordance with an instruction received from the controller.

3. The method of claim 1, wherein the IOAM E2E option header further comprises a namespace-id field and an IOAM E2E type field.

4. The method of claim 3, wherein the flags field is a part of the namespace-id field in the IOAM E2E option header.

5. The method of claim 1, wherein the flags field is a new field that is added in the first IOAM E2E option packet, and wherein the flags field comprises a plurality of flags including the first flag and the second flag.

6. The method of claim 1, wherein the first metadata comprises a first identifier and/or a first timestamp corresponding to the first IOAM E2E option packet, wherein the first identifier comprises a sequence number or a random number, and wherein the first timestamp represents a time at which the first IOAM E2E option packet was received by the network edge node.

7. The method of claim 1, further comprising generating, by a clock at the network edge node, a first timestamp corresponding to the first IOAM E2E option packet.

8. The method of claim 1, wherein the second metadata comprises a second timestamp corresponding to the second IOAM E2E option packet, and wherein the second timestamp represents a time at which the second IOAM E2E option packet was received by the network edge node.

9. The method of claim 8, further comprising:

transmitting a first timestamp corresponding to the first IOAM E2E option packet and the second timestamp to the controller, wherein the first timestamp represents a time at which the first IOAM E2E option packet was received by the network edge node; and determining a round-trip time (RTT) between the network edge node and the second network edge node based on a difference between the first timestamp and the second timestamp, wherein the network edge node is an ingress network edge node, and wherein the second network edge node is an egress network edge node.

10. The method of claim 1, further comprising filtering and periodically selecting target packets including the first IOAM E2E option packet from a packet flow based on predetermined parameters, wherein the filtering includes access control list (ACL) filtering.

11. A method implemented by a network edge node, comprising:

adding a header including a flags field and a data field including a first metadata to a first packet;

setting a first flag in the flags field of the header to a first value to indicate that the first packet is a forward flow packet;

transmitting the first packet towards a second network edge node;

receiving a second packet including the first metadata in the data field and a second flag in the flags field set to the same first value as the first flag to indicate that the second packet is a reverse flow packet;

generating a second metadata corresponding to receipt of the second packet; and transmitting an export message that includes the first metadata and the second metadata toward a controller.

12. The method of claim 11, wherein the header is added to the first packet in accordance with an instruction received from the controller.

13. The method of claim 11, wherein the flags field is a part of an existing field in the header of the first packet or a new field that is added in the first packet.

14. The method of claim 11, wherein the header is an in-situ operations, administration, and maintenance (IOAM) edge-to-edge (E2E) option header.

15. The method of claim 11, further comprising generating, by a clock at the network edge node, a first timestamp corresponding to the first packet, wherein the first timestamp represents a time at which the first packet was received by the network edge node.

16. The method of claim 11, wherein the second metadata comprises a second timestamp corresponding to the second packet, and wherein the second timestamp represents a time at which the second packet was received by the network edge node.

17. The method of claim 16, further comprising:

transmitting a first timestamp corresponding to the first packet and the second timestamp to the controller, wherein the first timestamp represents a time at which the first packet was received by the network edge node; and determining a round-trip time (RTT) between the network edge node and the second network edge node based on a difference between the first timestamp and the second timestamp, wherein the network edge node is an ingress network edge node, and wherein the second network edge node is an egress network edge node.

18. A network edge node, comprising:

a memory configured to store instructions; and a processor coupled to the memory and configured to execute the instructions to cause the network edge node to:

add a first in-situ operations, administration, and maintenance (IOAM) edge-to-edge (E2E) option header including a flags field and an IOAM E2E option data field including a first metadata to a first IOAM E2E option packet;

set a first flag in the flags field of the IOAM E2E option packet to a first value to indicate that the first IOAM E2E option packet is a forward flow packet;

transmit the first IOAM E2E option packet towards a second network edge node;

receive a second IOAM E2E option packet including the first metadata in the IOAM E2E option data field and a second flag in the flags field set to the same first value as the first flag to indicate that the second IOAM E2E option packet is a reverse flow packet;

generate a second metadata corresponding to receipt of the second IOAM E2E option packet; and transmit an export message that includes the first metadata and the second metadata toward a controller.

19. The network edge node of claim 18, wherein the IOAM E2E option header is added to the first IOAM E2E option packet in accordance with an instruction received from the controller.

20. The network edge node of claim 18, wherein the IOAM E2E option header further comprises a namespace-id field and an IOAM E2E type field.

* * * * *